United States Patent [19]

Kadotani et al.

[11] 3,915,659

[45] Oct. 28, 1975

[54] PURIFICATION OF SODIUM SILICOFLUORIDE BY SLURRYING WITH NaCl CONTAINING BRINE

[75] Inventors: Makoto Kadotani, Ube; Seishiro Isobe, Yamaguchi; Hiroaki Takeyasu, Ube, all of Japan

[73] Assignee: Central Glass Co., Ltd., Japan

[22] Filed: Feb. 13, 1973

[21] Appl. No.: 332,182

Related U.S. Application Data

[63] Continuation-in-part of Ser. No. 838,653, July 2, 1969, abandoned.

[30] Foreign Application Priority Data

July 8, 1968 Japan.................................. 43-47257

[52] U.S. Cl................ 23/293 R; 423/341; 423/202; 423/205; 423/208; 423/158
[51] Int. Cl.²....................... C01D 3/08; C01D 3/18
[58] Field of Search ........... 423/201, 202, 341, 179, 423/185, 658.5, 205, 208; 23/300, 293 R, 302; 134/2, 42

[56] References Cited

UNITED STATES PATENTS

| | | | |
|---|---|---|---|
| 1,247,165 | 11/1917 | Stahl.................................. | 423/185 |
| 1,456,594 | 5/1923 | Howard .............................. | 423/185 |
| 2,954,275 | 9/1960 | Carothers .......................... | 423/201 |
| 3,055,733 | 9/1962 | Long................................... | 423/185 |
| 3,462,242 | 8/1969 | Barker................................ | 423/179 |

*Primary Examiner*—Norman Yudkoff
*Assistant Examiner*—S. J. Emery
*Attorney, Agent, or Firm*—Sherman & Shalloway

[57] ABSTRACT

A process for the purification of sodium silicofluoride which comprises repulping sodium silicofluoride containing gypsum and/or phosphates as impurities in an aqueous solution containing sodium chloride for a time sufficient to effect a substantial removal of the impurities and thereafter recovering the purified sodium silicofluoride.

3 Claims, No Drawings

PURIFICATION OF SODIUM SILICOFLUORIDE BY SLURRYING WITH NaCl CONTAINING BRINE

This application is a continuation-in-part of Ser. No. 838,653, filed July 2, 1969 now abandoned.

This invention relates to a process for the purification of sodium silicofluoride containing gypsum phosphates or mixtures thereof as impurities. More particularly, it relates to a novel process for purifying sodium silicofluoride which involves repulping impure sodium silicofluoride in an aqueous solution containing NaCl, such as sea water and natural or artificial brine, to effectively remove the impurities present in the sodium silicofluoride without a substantial loss of sodium silicofluoride.

Sodium silicofluoride is used for producing synthetic cryolite, fluorides and enamel and has been produced by the water absorption of silicon tetrafluoride formed as a by-product in the production of a fertilizer, such as the superphosphates, and adding a sodium compound to the silicon tetrafluoride. Recently, wet process phosphoric acid has been used as a raw material for producing high purity phosphates, such as sodium orthophosphate and condensed sodium phosphate, in addition to the superphosphate fertilizers. Thus, another commercial method of producing sodium silicofluoride has been developed by which hydroflurosilic acid contained in the wet-process phosphoric acid is neutralized with a sodium compound in the purification process. Because of an increased demand for sodium silicofluoride in recent years, sodium silicofluoride produced from the wet-process phosphoric acid has become economically advantageous. Generally, sodium silicofluoride produced from wet-process phosphoric acid contains fine particles of gypsum, even after a separating procedure. The gypsum remains in a suspended or dispersed state together with organic matter in the phosphoric acid because of the failure of filtration to remove these fine particles and because gypsum is present in saturated or supersaturated condition. The gypsum coprecipitates with sodium silicofluoride when hydroflurosilicic acid is neutralized by adding a sodium compound, such as caustic soda, sodium carbonate and sodium chloride to the wet-process phosphoric acid. Also, impurities, such as iron and aluminum dissolved in the phosphoric acid coprecipitate with the sodium silicofluoride in the form of their water-insoluble or difficulty water-soluble phosphates, such as iron phosphate and aluminum phosphate or complex salts thereof.

It is extremely difficult in commercial practice to ensure a complete filtration of the above-mentioned impurities. Even if suspended impurities such as fine particles of gypsum are completely removed, saturated or supersaturated gypsum is precipitated during the addition of Na salts, and the sodium silicofluoride produced by this method contains gypsum. For this reason, sodium silicofluoride produced from wet-process phosphoric acid tends to contain a considerable amount of gypsum. Since gypsum is very slightly soluble in water or ordinary acids, and since sodium silicofluoride is considerably more soluble than gypsum except when there is a high concentration of acid, attempts to remove gypsum completely by customary purification procedures, such as repulping with water, warm water or acids, have resulted in very large losses of sodium silicofluoride. From the economic standpoint, it is practically impossible to practice the above-mentioned process on an industrial scale because it gives an unsatisfactory yield and also requires the use of great quantities of water or acids.

One process of purifying sodium silicofluoride obtained from the wet-process phosphoric acid is described in U.S. Pat. No. 3,055,733 in which a 98–99% purity sodium silicofluoride is obtained by repulping sodium silicofluoride of 94–97% purity at 80°C. using one part of 30% $P_2O_5$ and one part of 13% hydroflurosilicic acid, both based on one part of the crude sodium silicofluoride. This method is economically disadvantageous because expensive hydrofluorsilicic acid and phosphoric acid must be used in great quantities to remove gypsum and there is a large loss of fluorine in view of an overall balance of fluorine. Furthermore, there is a problem with respect to corrosion of the repulping vessel since the repulping temperature may be as high as 80°C. Also, if the gypsum present in sodium silicofluoride is to be removed at such a high temperature, a part of the gypsum reacts with hydroflurosilicic acid or sodium silicofluoride to form calcium fluoride, and consequently calcium is still present in the sodium silicofluoride. This appears to be the reason why, in spite of an acid washing at such a high temperature, sodium silicofluoride of more than 99% purity cannot be obtained. If the impure sodium silicofluoride has a large gypsum content, it will be more difficult to purify it by such a method. Therefore, the process of this U.S. patent appears to be restricted to the use of sodium silicofluoride having a purity of 94–97% or more as a starting material. In summary, this process has not proved satisfactory because it is limited to the purification of sodium silicofluoride with a limited purity as mentioned above; costly hydroflurosilicic acid and phosphoric acid are necessary for the purification; there is a large loss of fluorine in view of an overall balance of fluorine; and corrosion occurs in the purifying apparatus.

U.S. Pat. No. 2,883,266 discloses a process comprising adding $H_2SO_4$ to wet-process phosphoric acid, for instance, crude phosphoric acid containing 27.02% of $P_2O_5$ and 0.5% of $H_2SO_4$ to adjust the concentration of $H_2SO_4$ to 1.5% in order to precipitate the crude phosphoric acid, separating the gypsum, and adding caustic soda and sodium silicate to recover the fluorine contained in the crude phosphoric acid as sodium silicofluoride. Although this method is satisfactory for preparing sodium silicofluoride free from gypsum, this process is economically disadvantageous because further excess sulfuric acid is necessary after production of phosphoric acid by the wet-process. It is also unsuitable for obtaining a high purity phosphoric acid by the wet-process. Furthermore, unless the crystallized gypsum is completely separated by filtration, fine particles of gypsum are suspended or dispersed in the crude phosphoric acid and this gypsum is entrained in the precipitated sodium silicofluoride. As mentioned before, fine particles of gypsum suspended in crude phosphoric acid are difficult to separate completely.

It is within the above environment and background that the process of the present invention was developed. Briefly, this process comprises slurrying impure sodium silicofluoride containing, on a dry basis, from 70–95% by weight $Na_2SiF_6$, 1–6% by weight calcium, 3 to 13% by weight sulfate and 0.5 to 2% by weight $P_2O_5$ with from 10 to 350 liters per kilogram of impure sodium silicofluoride, of an aqueous solution containing sodium chloride selected from sea water, natural brine and artificial brine, wherein the concentration of sodium chloride is within the range of from 2 to 25% by weight; agitating the resultant slurry for a time sufficient to effect a substantial removal of the calcium, sulfate and $P_2O_5$ impurities and recovering purified sodium silicofluoride.

It is the primary object of the invention to provide a process for purifying sodium silicofluoride to high purity by selectively removing gypsum and/or phosphate impurities from sodium silicofluoride produced from wet-process phosphoric acid without a substantial loss of sodium silicofluoride.

Another object of the invention is to provide an economical process for production of high purity sodium silicofluoride by purifying sodium silicofluoride containing gypsum and/or phosphates as impurities without using costly or highly acidic reagents and without any corrosion of equipment.

It is a still further object of the present invention to produce high purity sodium silicofluoride using a sodium chloride solution.

Still further objects and advantages of the process of the present invention will become more apparent from the following more detailed description thereof.

The foregoing objects of the invention are achieved by a process for purifying sodium silicofluoride which involves repulping sodium silicofluoride containing gypsum or phosphates as impurities in an aqueous solution containing sodium chloride for a time sufficient to effect a substantial removal of these impurities, and then recovering the purified sodium sulicofluoride.

The sodium silicofluoride containing gypsum and/or phosphates used in the purification process of the present invention is generally sodium silicofluoride precipitated by addition of a sodium compound, such as NaOH, $Na_2CO_3$ or NaCl to the wet-process phosphoric acid. The composition of this sodium silicofluoride may vary according to the composition of the wet-process phosphoric acid and the method of recovering sodium silicofluoride, but is generally as shown below on the dry basis:

| | |
|---|---|
| $Na_2SiF_6$ | 70 – 95% |
| Ca | 1 – 6% |
| $SO_4$ | 3 – 13% |
| $P_2O_5$ | 0.5 – 2% |

The sodium silicofluoride contains, in addition to the high quantity of gypsum, water-insoluble or difficultly water-soluble phosphates such as iron phosphate and aluminum phosphate and complex salts thereof, water-soluble salts such as $NaH_2PO_4$, $Na_2HPO_4$, $NaHSO_4$ and $Ca(H_2PO_4)_2$, and organic matter. These impurities can be effectively eliminated by the repulping procedure in an aqueous solution containing sodium chloride in accordance with the present invention. Furthermore, it should be understood that the process of the present invention is also applicable to the purification of impure sodium silicofluorides similar to those obtained by the wet-process.

Saline water exhibits a unique behavior towards sodium silicofluoride containing gypsum as an impurity. Specifically, when a mixture of gypsum and sodium silicofluoride is added to an aqueous solution containing 2.5 g NaCl/100 cc at 20°C. for instance, the solubility of gypsum becomes two or more times as large as that in water at room temperature, which the solubility of sodium silicofluoride is reduced to one-tenth or less of that in water. The solubilities of gypsum and sodium silicofluoride in water at various concentrations of sodium chloride are shown in Table 1 below.

Table 1

(Unit : g/100 cc solution at 20°C.)

| NaCl concentration | Substance to be dissolved | $Na_2SiF_6$ | $CaSO_4$ |
|---|---|---|---|
| 0 | | 0.670 | 0.212 |
| 2.5 | | 0.043 | 0.475 |
| 5.0 | | 0.026 | 0.600 |
| 10.0 | | 0.015 | 0.695 |
| 15.0 | | 0.011 | 0.723 |
| 20.0 | | 0.007 | 0.692 |
| 25.0 | | 0.0006 | 0.645 |

The values in this column are those of calcium sulphate dihydrate calculated as calcium sulphate anhydride. Hence, the amounts dissolved of calcium sulphate dihydrate can be calculated by multiplying these figures with

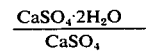

$$\frac{CaSO_4 \cdot 2H_2O}{CaSO_4}$$

Consequently, the use of an aqueous solution of sodium chloride as a repulping medium makes it possible to remove gypsum effectively from sodium silicofluoride containing great quantities of impurities such as gypsum without involving any substantial loss of sodium silicofluoride.

The concentration of sodium chloride in the aqueous sodium chloride solution should be such that it inhibits the dissolving of $Na_2SiF_6$ but facilitates the dissolving of gypsum and, as such, should be at least 2.0%. Too high a concentration, however, does not give an increased effect, but rather reduces the amount of calcium sulphate dihydrate dissolved, resulting in an economical disadvantage. It is, therefore, preferable that the upper limit of the concentration should be 25%. The most preferable concentration is in the range of 2.0 to 10%. The aqueous solution containing sodium chloride includes not only a solution of sodium chloride dissolved in water in the above-specified concentration, but also sea water and natural or artificial brine. The sea water and natural or artificial brine are readily available, and are particularly preferred from an economical standpoint.

Minor amounts, i.e., 1–70 g/liter when one of the substance is used alone and 1–100 g/liter as a combined total amount when they are used in combination, of substances which increase the solubilities of gypsum and other impurities, such as mineral acids, for instance, hydrochloric acid, nitric acid and sulfuric acid, magnesium chloride, magnesium nitrate and ammonium chloride may be added to an aqueous solution containing sodium chloride used as the repulping medium in the present invention, thereby making it possible to obtain a high purity sodium silicofluoride even when this aqueous solution is employed in an amount smaller than an aqueous solution of sodium chloride alone. When these additives for accelerating the dissolving of impurities, particularly mineral acids, are also used, the removal of water-insoluble of difficulty water-soluble phosphates becomes easy, and the loss of sodium silicofluoride can be lessened drastically as compared with the use of an aqueous solution of these mineral acids singly.

Furthermore, in addition to sodium chloride, minor amounts, for instance, 0.01–20 g/liter, of additives for inhibiting the dissolving of sodium silicofluoride, such as sodium carbonate, sodium nitrate, sodium tetrafluoroborate ($NaBF_4$), and sodium salts of organic acids, may be added singly or in combination to the repulping medium used in the invention. This ensures a further reduction in the loss of sodium silicofluoride. These inhibiting additives are particularly effective when combined with the above-mentioned impurity dissolving accelerators.

According to the present invention, impure sodium silicofluoride is added to the repulping medium consisting of an aqueous solution containing sodium chloride, and repulped for a time sufficient to effect a substantial removal of impurities in the sodium silicofluoride.

The term "repulping" used in the present specification and claims means a procedure of slurrying impure sodium silicofluoride with an aqueous solution containing sodium chloride and agitating the slurry. In the repulping of sodium silicofluoride, sodium silicofluoride may be added, in the form as obtained from the wet-process phosphoric acid, to an aqueous solution containing sodium chloride. Also, the sodium silicofluoride may be pulverized to a particle size, for instance, of less than 100 microns before repulping in an aqueous solution containing sodium chloride.

The ratio of the repulping medium to the starting sodium silicofluoride may be such that the gypsum concentration in the aqueous solution containing sodium chloride is lower than the saturation concentration. Generally, it is preferable to use 10–350 liters, particularly 20–80 liters of an aqueous solution containing sodium chloride per kilogram of sodium silicofluoride. Use of the repulping medium in an amount exceeding the above-specified range will result in an excessive loss of sodium silicofluoride, and the impurities will not be completely removed with the repulping medium of an amount smaller than the above-specified range. The repulping temperature is preferably in the range from room temperature to 70°C. With the temperature exceeding 70°C., reaction between gypsum and sodium silicofluoride proceeds and calcium fluoride and silica tend to be precipitated. Therefore, temperatures not in excess of 70°C. are preferable. No particular restriction is imposed on the pressure, and the objects of the invention can be sufficiently achieved by employing normal atmospheric pressure. The repulping time varies according to the temperature and the amounts of impurities, but is generally between 5 minutes and 1 hour so as to remove the impurities substantially.

The repulping operation is conducted by using a mixing vessel provided with an agitator, and agitating a slurry of sodium silicofluoride under the above-mentioned conditions. The operation may be performed in a single step or in two or more steps, and either continuously or batchwise. For instance, sodium silicofluoride may be added in a first step to a large amount of an aqueous solution containing sodium chloride, repulped, and allowed to stand to separate the resulting supernatant liquid, and in a second step the slurry obtained is repulped directly or after adding thereto a substance such as mineral acid which increases the solubilities of impurities. Also, repulping may be effected by contacting sodium silicofluoride and an aqueous solution containing sodium chloride concurrently or countercurrently.

According to the process of the present invention, the purified sodium silicofluoride may be separated from the repulping medium by known solid liquid separating procedures, such as filtration, centrifugal separation and decantation. The separated sodium silicofluoride is, if desired, washed with water, and dried to form a final product.

Thus, in accordance with the process of the present invention it is possible to obtain sodium silicofluoride of a purity as high as 99% or more from crude sodium silicofluoride containing 30% or less of such impurities as gypsum and phosphates. The loss of sodium silicofluoride at this time is slight, and is, for instance, 4.6% when an 80% purity material is purified to a 99.4% purity product. The purification process of the present invention has advantages over known methods because it can be performed with a simple operation, using as the repulping medium sea water or natural or artificial brine, which are low in cost.

The sodium silicofluoride obtained in accordance with the process of the invention has a high purity and is useful as a starting material for the production of synthetic cryolites and fluorides and in other applications.

The invention will further be described by way of the following illustrative examples. The percentages in these examples are on a weight basis unless otherwise specified.

COMPARATIVE EXAMPLE 1

1.50 Kg of sodium silicofluoride containing impurities and having a water content of 21.29% as shown in Table 2 below was added to 45 liters of water, and repulped for 30 minutes at 20° and 50°C. respectively, followed by separation, washing with 2 liters of water per kilogram of sodium silicofluoride, and drying at 110°C.

The same sodium silicofluoride was added to 25 liters of a solution containing 5 g/liter of HCl and 9 liters of a solution containing 40 g/liter of HCl, and repulped for 30 minutes at room temperature in a mixing vessel provided with an agitator, followed by separation, washing with 2 liters of water per kilogram of sodium silicofluoride, and drying at 110°C. The composition of the sodium silicofluoride before and after repulping and the loss of sodium silicofluoride are shown in Table 2.

It is seen from the results obtained that when water or an aqueous hydrochloric acid is used as the repulping medium, there is a very large loss of sodium silicofluoride.

Table 2

| Specimen | Item | | Amount of the repulping medium (liters) | Analytical values of sodium silicofluoride (% based on the dry weight) | | | | | | Loss of sodium silicofluoride* (wt. %) | Remarks |
|---|---|---|---|---|---|---|---|---|---|---|---|
| | | | | $Na_2SiF_6$ | Na | F | Ca | $SO_4$ | $P_2O_5$ | | |
| Theoretical value | | | — | 100.0 | 24.46 | 60.62 | — | — | — | — | X-ray diffraction pattern indicated the presence of $Na_2SiF_6$ and $CaSO_4.2H_2O$ |
| Before repulping | | | — | 84.8 | 20.84 | 51.40 | 2.79 | 6.67 | 1.24 | — | |
| After treatment, repulping | $H_2O$ | 20°C | 45 | 96.6 | 23.61 | 58.55 | 0.67 | 1.59 | 0.16 | 30.2 | X-ray diffraction pattern indicated the presence of $CaSO_4.2H_2O$ |
| | $H_2O$ treatment, | 50°C. | 45 | 95.2 | 23.35 | 57.72 | 1.12 | 2.66 | 0.07 | 55.6 | |
| After repulping | 5 g liter HCl added | | 25 | 99.6 | 24.36 | 60.41 | None | trace | 0.06 | 30.0 | X-ray diffraction pattern indicated $Na_2SiF_6$ only. The microscopic observation showed that there was no gyps in about 5 minute after initiation of repulping |
| | 40 g liter HCl added | | 9 | 99.8 | 24.41 | 60.49 | None | trace | 0.05 | 15.9 | |

$$* \frac{\text{Sodium silicofluoride lost by dissolving during repulping}}{\text{Pure sodium silicofluoride in impure sodium silicofluoride}} \times 100$$

EXAMPLE 1

1.54 Kg of sodium silicofluoride (water content being 18.58%) containing on a dry basis 8.45% of $SO_4$, i.e. 15.15% calculated as $CaSO_4 2H_2O$ and 0.89% of $P_2O_5$, which was obtained by adding soda ash or caustic soda to wet-process phosphoric acid and filtering and washing the resulting crystals, was added to 30 liters of a 3% aqueous solution of sodium chloride and 21 liters of a 10% aqueous solution of sodium chloride respectively. The sodium silicofluoride was repulped for 30 minutes at room temperature in a mixing vessel provided with an agitator, separated and washed with 2 liters of water per kilogram of sodium silicofluoride, and dried at 110°C.

The composition of the sodium silicofluoride before and after repulping and the loss of sodium silicofluoride are given in Table 3.

As shown from the results in Table 3, by using an aqueous solution of sodium chloride as the repulping medium, it is possible to completely remove the gypsum impurities from sodium silicofluoride.

EXAMPLE 2

Three samples of sodium silicofluoride (a) 1.37 Kg having a water content of 19.61%, (b) 1.50 Kg having a water content of 21.29%, and (c) 1.54 Kg having a water content of 18.18% were added respectively to 20 liters, 45 liters and 58 liters of sea water with an NaCl concentration of 27.34 g/liter, and repulped for 15 minutes at room temperature in a mixing vessel provided with an agitator. Following separation and washing with 2 liters of water per kilogram of sodium silicofluoride, the sodium silicofluoride was dried at 110°C.

The composition of the sodium silicofluoride before and after repulping and the loss of sodium silicofluoride are shown in Table 4.

Table 3

| Specimen | Item | | Amount of the repulping medium (liters) | Analytical values of sodium silicofluoride (% based on the dry weight) | | | | | | Loss of sodium silicofluoride (wt. %) | Remarks |
|---|---|---|---|---|---|---|---|---|---|---|---|
| | | | | $Na_2SiF_6$ | Na | F | Ca | $SO_4$ | $P_2O_5$ | | |
| Theoretical values | | | — | 100.0 | 24.46 | 60.62 | — | — | — | — | X-ray diffraction pattern indicated the presence of $Na_2SiF_6$ and $CaSO_4.2H_2O$ |
| Before repulping | | | — | 80.0 | 19.75 | 48.51 | 3.40 | 8.45 | 0.89 | — | |
| After repulping | 3 % NaCl treatment | | 30 | 99.3 | 24.30 | 60.21 | none | trace | 0.16 | 2.3 | X-ray diffraction pattern indicated the presence of $Na_2SiF_6$ only. The microscopic observation showed that there was no gypsum in about 5 minutes after initiation of repulping |
| | 10 % NaCl treatment | | 21 | 99.1 | 24.25 | 60.05 | none | trace | 0.18 | 0.5 | |

Table 4

| Specimen | Item | Amount of the repulping and medium (liters) | Analytical values of sodium silicofluoride (% based on the dry weight) | | | | | Loss of sodium silicofluoride (wt. %) | Remarks |
|---|---|---|---|---|---|---|---|---|---|
| | | | $Na_2SiF_6$ | Na | F | Ca | $SO_4$ | $P_2O_5$ | | |
| Before repulping | Sample A | — | 90.8 | 2.32 | 55.06 | 1.26 | 3.10 | 0.65 | — | |
| | Sample B | — | 84.8 | 0.84 | 51.40 | 2.79 | 6.67 | 1.24 | — | X-ray diffraction pattern indicated the presence of $Na_2SiF_6$ and $CaSO_4 \cdot 2H_2O$. |
| | Sample C | — | 80.0 | 9.75 | 48.51 | 3.40 | 8.45 | 0.89 | — | |
| After repulping | Sample A | 20 | 99.6 | 4.35 | 60.42 | none | trace | 0.14 | 1.6 | X-ray diffraction pattern indicated the presence of $Na_2SiF_6$ only. The microscopic observation showed that there was no gypsum in about 5 minutes after initiation of repulping |
| | Sample B | 45 | 99.3 | 4.26 | 60.19 | none | trace | 0.14 | 3.5 | |
| | Sample C | 58 | 99.4 | 4.29 | 60.23 | none | trace | 0.16 | 4.6 | |

EXAMPLE 3

1.50 Kg of sample B of Example 2 was added to 45 liters of the same sea water as used in Example 2, and repulped for 15 minutes at room temperature in a mixing vessel provided with an agitator. The repulped product was left to stand for 30 minutes, and on removal of a part of the supernatant liquid, a slurry of about 30% sodium silicofluoride was obtained. The slurry was further repulped for 30 minutes at 55° C., followed by separation, washing with 2 liters of water per kilogram of sodium silicofluoride, and drying at 110° C.

The composition of the sodium silicofluoride before and after repulping and the loss of the sodium silicofluoride are shown in Table 5.

Table 5

| Item Specimen | Analytical values of sodium silicofluoride (% based on the dry weight) | | | | | | Loss of sodium silicofluoride (wt. %) | Remarks |
|---|---|---|---|---|---|---|---|---|
| | $Na_2SiF_6$ | Na | F | Ca | $SO_4$ | $P_2O_5$ | | |
| Before repulping (Sample B) | 84.6 | 20.84 | 51.40 | 2.79 | 6.67 | 1.24 | | X-ray diffraction pattern indicated the presence of $Na_2SiF_6$ and $CaSO_4 \cdot 2H_2O$. |
| After repulping | 99.3 | 24.27 | 60.21 | none | trace | 0.069 | 3.8 | X-ray diffraction pattern indicated the presence of $Na_2SiF_6$ alone |

EXAMPLE 4

1.50 Kg of Sample B of Example 2 was repulped in the same sea water as used in Example 2 and also in a Table 6

| Specimen | Item | Amount of the repulping medium (liters) | Concentration of additives (g/liters) | Analytical values of sodium silicofluoride (% based on the dry weight) | | | | | | Loss of sodium silicofluoride (wt. %) | Remarks |
|---|---|---|---|---|---|---|---|---|---|---|---|
| | | | | $Na_2SiF_6$ | Na | F | Ca | $SO_4$ | $P_2O_5$ | | |
| Before repulping (Sample B) | | — | — | 84.8 | 20.84 | 51.40 | 2.79 | 6.67 | 1.24 | — | X-ray diffraction pattern indicated The presence of $Na_2SiF_6$ and $CaSO_4 \cdot 2H_2O$ |
| After repulping | Sea water added | 45 | — | 99.3 | 24.26 | 60.19 | none | trace | 0.14 | 3.5 | |
| | HCl added | 21 | 5.0 | 99.7 | 24.35 | 60.47 | none | trace | 0.06 | 2.6 | X-ray diffraction pattern indicated the presence of $Na_2SiF_6$ only. The microscopic observation showed that there was no gypsum in about 5 minutes after initiation of repulping |
| | $MgCl_2$ added | 24 | 10.0 | 99.5 | 24.31 | 60.26 | none | trace | 0.19 | 1.4 | |
| | $NH_4Cl$ added | 27 | 10.0 | 99.2 | 24.25 | 60.15 | none | trace | 0.13 | 1.7 | |
| | $HNO_3$ added | 26 | 5.0 | 99.6 | 24.38 | 60.38 | none | trace | 0.07 | 2.8 | |
| | $Mg(NO_3)_2$ added | 27 | 10.0 | 99.1 | 24.23 | 60.09 | none | trace | 0.18 | 1.6 | | mixture of sea water and in varying amounts of each of hydrochloric acid, magnesium chloride, ammonium chloride, nitric acid, and magnesium nitrate as indicated in Table 6 for 30 minutes at room temperature using a mixing vessel provided with an agitator. Following separation and washing with 2 liters of water per kilogram of sodium silicofluoride, the material was dried at 110° C. The amounts of the repulping media, the concentrations of the additives, the composition of sodium silicofluoride before and after repulping, and the loss of sodium silicofluoride are given in Table 6.

EXAMPLE 5

1.50 Kg of Sample B of Example 2 was added to 45 liters of the same sea water as used in Example 2, and repulped for 15 minutes at room temperature in a mixing vessel provided with an agitator. After allowing it to stand for 30 minutes, the supernatant liquid was removed partly to form a 30% slurry of sodium silicofluoride. Sulfuric acid was added to the slurry to obtain a 0.5 N solution, and the sample was further repulped for 30 minutes at 55° and 70° C., respectively, followed by separation, washing with 2 liters of water per kilogram of sodium silicofluoride, and drying at 110° C. The composition of the sodium silicofluoride before and after repulping and the loss of sodium silicofluoride are shown in Table 7.

perature to 70°C. the impure sodium silicofluoride which contains, on a dry weight basis, 70 to 95% $Na_2SiF_6$ and impurities of 1 to 6% calcium, 3 to 13% sulfate and 0.5 to 2% $P_2O_5$, with from 10 to 350 liters per kilogram of impure sodium silicofluoride of an aqueous solution which is a brine, wherein the concentration of sodium chloride is within the range of from 2 to 25% by weight;

adding at least one substance, the addition of which increases the solubilities of the impurities, selected from the group consisting of hydrochloric acid, nitric acid, sulfuric acid, magnesium chloride, magnesium nitrate, and ammonium chloride, added in an amount of from 1 to 70 grams per liter where only one substance is added and from 1 to 100 grams per liter where more than one substance is added; and adding at least one further substance, the addition of which inhibits the solubility of sodium silicofluoride, selected from the group consisting of sodium carbonate, sodium nitrate, sodium tetrafluoroborate, and sodium salts of organic acids, added in an amount of from 0.01 to 20 grams per liter B. agitating the resultant slurry for from 5 to 60 minutes, so as to effect a substantial removal of said calcium, sulfate and $P_2O_5$ impurities; and C. recovering purified sodium silicofluoride from the remaining slurry.

Table 7

| Specimen | Item | Analytical values of sodium silicofluoride (% based on the dry weight) | | | | | | | | Loss of sodium silicofluoride (wt. %) | Remarks |
|---|---|---|---|---|---|---|---|---|---|---|---|
| | | $Na_2SiF_6$ | Na | F | Ca | $SO_4$ | $P_2O_5$ | $Fe_2O_3$ | $Al_2O_3$ | | |
| Before repulping (Sample B) | | 84.8 | 20.84 | 51.40 | 2.79 | 6.67 | 1.24 | 0.032 | 0.18 | — | X-ray diffraction pattern indicated the presence of $Na_2SiF_6$ and $CaSO_4 \cdot 2H_2O$ |
| After repulping | treatment at 55°C | 99.8 | 24.35 | 60.48 | none | trace | 0.028 | 0.005 | 0.05 | 4.1 | X-ray diffraction pattern indicated the presence of $Na_2SiF_6$ only. |
| | treatment at 70°C | 99.7 | 24.37 | 60.41 | none | trace | 0.019 | 0.005 | 0.05 | 4.3 | |

What is claimed is:

1. In the production of sodium silicofluoride precipitated from wet-process phosphoric acid, the improvement comprising purifying the obtained sodium silicofluoride that has already been washed by:

A. slurrying at temperatures ranging from room tem-

2. The process of claim 1, wherein from 20 to 80 liters of said aqueous solution per kilogram of impure silicofluoride are slurried.

3. The process of claim 1, wherein the concentration of sodium chloride is from 2 to 10% by weight.

* * * * *

UNITED STATES PATENT OFFICE
CERTIFICATE OF CORRECTION

Patent No. 3,915,659　　　　　　　　Dated　October 28, 1975

Inventor(s)　KADOTANI ET AL

It is certified that error appears in the above-identified patent and that said Letters Patent are hereby corrected as shown below:

Please correct the foreign application priority data to read -- July 7, 1968 --

Signed and Sealed this third Day of February 1976

[SEAL]

Attest:

RUTH C. MASON
*Attesting Officer*

C. MARSHALL DANN
*Commissioner of Patents and Trademarks*